United States Patent
Turner et al.

(10) Patent No.: US 9,863,457 B2
(45) Date of Patent: Jan. 9, 2018

(54) DIRECT TENSION INDICATING WASHER WITH OFFSET PROTUBERANCES AND INDENTATIONS

(71) Applicant: TurnaSure LLC, Langhorne, PA (US)

(72) Inventors: F. Jonathan M. Turner, Philadelphia, PA (US); David L. Sharp, Warrington, PA (US)

(73) Assignee: TurnaSure LLC, Langhorne, PA (US)

( * ) Notice: Subject to any disclaimer, the term of this patent is extended or adjusted under 35 U.S.C. 154(b) by 77 days.

(21) Appl. No.: 14/938,081

(22) Filed: Nov. 11, 2015

(65) Prior Publication Data

US 2017/0130758 A1    May 11, 2017

(51) Int. Cl.
*F16B 31/02* (2006.01)
*F16B 5/02* (2006.01)

(52) U.S. Cl.
CPC ............ *F16B 31/028* (2013.01); *F16B 5/025* (2013.01)

(58) Field of Classification Search
CPC ............................... F16B 31/028; F16B 5/025
USPC ........................................................ 411/8–11
See application file for complete search history.

(56) References Cited

U.S. PATENT DOCUMENTS

| | | | |
|---|---|---|---|
| 3,187,621 A | 6/1965 | Turner | |
| 3,285,120 A | 11/1966 | Kartiala | |
| 3,476,009 A * | 11/1969 | Markey Roscoe I . | F16B 31/028 411/11 |
| 3,534,651 A | 10/1970 | Belfiglio | |
| 4,020,734 A | 5/1977 | Bell | |
| 4,103,725 A * | 8/1978 | Abe | F16B 39/24 411/160 |
| 4,302,136 A * | 11/1981 | Abe | F16B 39/24 411/156 |
| 4,303,001 A | 12/1981 | Trungold | |
| 4,431,353 A | 2/1984 | Capuano | |
| 4,571,133 A * | 2/1986 | Lindow | F16B 31/04 411/11 |
| 4,887,948 A | 12/1989 | Calmettes | |
| 4,889,457 A | 12/1989 | Hageman | |

(Continued)

FOREIGN PATENT DOCUMENTS

| | | |
|---|---|---|
| EP | 0100555 | 2/1984 |
| EP | 0315501 | 5/1989 |

(Continued)

OTHER PUBLICATIONS

European Search Report for European Application No. EP 16198081 issued by the European Patent Office and dated Mar. 8, 2017.

*Primary Examiner* — Gary Estremsky
(74) *Attorney, Agent, or Firm* — Stradley Ronon Stevens & Young, LLP

(57) ABSTRACT

A direct tension indicating washer including an annular body with a central hole, one or more protuberances, and one or more indentations. The one or more protuberances are integral with the annular body, and struck and partially sheared from the annular body to project from a first face of the annular body and leave the one or more corresponding indentations in a second face of the annular body opposite the first face. The one or more indentations are offset from the one or more protuberances and located farther from the central hole of the annular body than the one or more protuberances. By offsetting the protuberances and indentations, the washer is strengthened and is more suitable for use in joint assemblies having enlarged or oversized holes.

20 Claims, 23 Drawing Sheets

(56) References Cited

U.S. PATENT DOCUMENTS

| | | | |
|---|---|---|---|
| 5,015,132 | A | 5/1991 | Turner et al. |
| 5,370,483 | A | 12/1994 | Hood et al. |
| 5,487,632 | A | 1/1996 | Hood et al. |
| 5,667,346 | A | 9/1997 | Sharp |
| 5,769,581 | A | 6/1998 | Wallace et al. |
| 5,913,647 | A | 6/1999 | Hodge |
| 5,931,618 | A | 8/1999 | Wallace et al. |
| 6,135,687 | A | 10/2000 | Leek et al. |
| 6,152,665 | A | 11/2000 | Wallace et al. |
| 6,204,771 | B1 | 3/2001 | Ceney |
| 6,425,718 | B1 | 7/2002 | Herr et al. |
| 6,729,819 | B2 | 5/2004 | Wallace |
| 7,014,404 | B2 | 3/2006 | Chiang |
| 7,635,243 | B2 | 12/2009 | Turner et al. |
| 7,857,562 | B2 | 12/2010 | Wallace |
| 8,197,167 | B2 | 6/2012 | Turner et al. |
| 8,382,409 | B2 | 2/2013 | Wallace |
| 8,591,157 | B1 | 11/2013 | Stewart et al. |
| 8,696,275 | B2 | 4/2014 | Wallace et al. |
| 8,991,266 | B2 | 3/2015 | Hsieh |
| 2002/0076296 | A1 | 6/2002 | Dunfee |
| 2008/0038076 | A1 | 2/2008 | Turner |
| 2008/0138167 | A1* | 6/2008 | Wallace ............... F16B 31/028 411/14 |
| 2013/0170924 | A1 | 7/2013 | Wallace et al. |
| 2013/0302106 | A1 | 11/2013 | Appl et al. |
| 2015/0204368 | A1 | 7/2015 | Stewart |

FOREIGN PATENT DOCUMENTS

| | | |
|---|---|---|
| FR | 2955366 | 7/2011 |
| WO | 94/01689 | 1/1994 |
| WO | 2013/169639 | 11/2013 |

\* cited by examiner

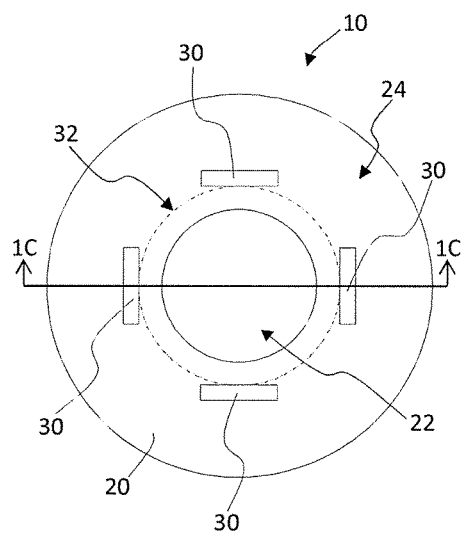
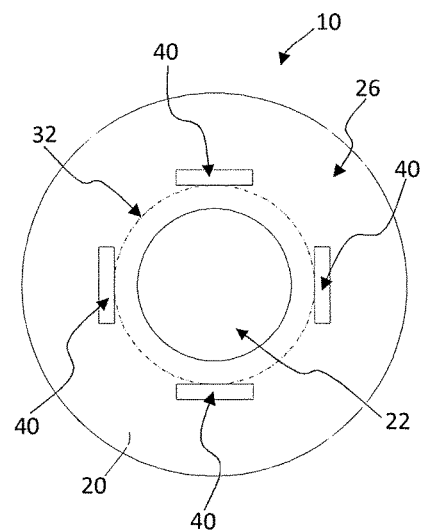
FIG. 1A
(prior art)
FIG. 1B
(prior art)
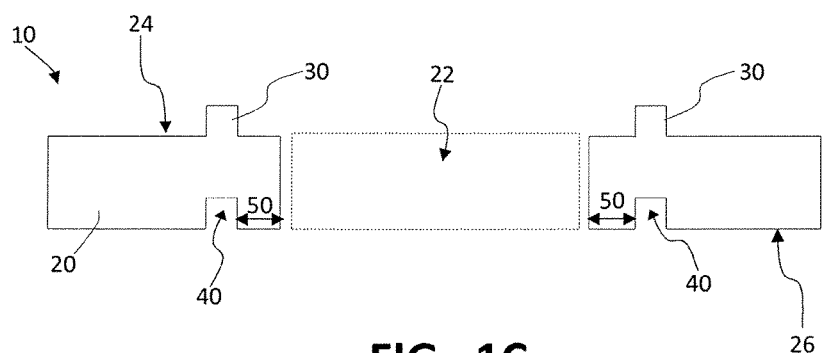
FIG. 1C
(prior art)

FIG. 6A  FIG. 6B

DIRECT TENSION INDICATING WASHER WITH OFFSET PROTUBERANCES AND INDENTATIONS

TECHNICAL FIELD

The present invention relates generally to tension indicating washers, and particularly to tension indicating washers having one or more pairs of offset indentations and protuberances useful in installations with enlarged bolt holes or with washers or plates having enlarged inner diameters.

BACKGROUND

In the construction of steel structures, it is common to join two or more joint members (e.g., a beam to a column) together by forming holes in each of the joint members, forming matching holes in splice plates spanning between the joint members, inserting bolts through the holes, and securing the bolts on the opposite side of the joint members with nuts. In order to allow for variances (such as coatings on the bolt, tolerances in bolt straightness, etc.), construction codes (such as the codes established by the American Institute of Steel Construction and the American Association of State Highway Transportation Officials) require that the holes in the joint members be larger than the diameter of the bolt shank by a specified amount. Any enlarged bolt holes that exceed a certain diameter, however, are required by the applicable codes to have washers or plates placed over the enlarged bolt holes to ensure connection performance.

It is further known in the art to use a direct tension indicating (DTI) washer, also referred to as a load indicating washer or fastener, to control the tightening of a fastened joint by developing an indication of the tension in the fastener. Using DTI washers to measure tension in the fastener is preferable to measuring tension based on torque control because torque control measurements can result in wide variations in the tension in the fastener. Variations in the tension may result from factors such as variations in fastener lubricity, burrs on the thread of threaded fasteners, variations in the friction at the bearing surface between the joint member and the threaded fastener, dirt or corrosion on the threads, temperature, etc.

A typical DTI washer includes a plurality of protuberances which are struck and partially sheared from an annular body to leave indentations in the annular body. For example, as depicted in FIGS. 1A-1C, a prior art DTI washer 10 includes an annular body 20 surrounding a central hole 22. FIG. 1A depicts a top view of the prior art DTI washer 10, FIG. 1B depicts a bottom view of the prior art DTI washer 10, and FIG. 1C depicts a cross-sectional view of the prior art DTI washer 10 along line 1C-1C of FIG. 1A. A first face 24 of the annular body 20 includes a plurality of protuberances 30 surrounding the central hole 22 along a concentric circle 32. A second face 26 of the annular body 20 includes a plurality of indentations 40. The area of the annular body 20 between the plurality of indentations 40 and the central hole 22 is referred to as the web 50. DTI washers of this type are disclosed in U.S. Pat. No. 5,015,132. Although many variations of these washers are known (for example, U.S. Pat. No. 5,667,346 discloses DTI washers having curved protuberances), prior art DTI washers share a common feature of the protuberances 30 being aligned with and centered over the indentations 40.

Referring to FIGS. 2A-2B, the prior art DTI washer 10 may be used in the joining of two or more joint members 110 in an exemplary joint assembly 100. As depicted in FIG. 2A, the prior art DTI washer 10 is placed on a first side of the joint members 110. An externally threaded member, such as a bolt 120 having a head 122 and a threaded shank 124, is then inserted through the joint members 110 and the central hole 22 of the prior art DTI washer 10 so that a bearing surface 126 of the bolt 120 is in contact with the protuberances 30 of the prior art DTI washer 10. Next, an internally threaded member, such as a nut 130, is attached to the shank 124 of the bolt 120 on a second side of the joint members 110 opposite the head 122 of the bolt 120. In some cases, a washer 140 may be positioned between the second side of the joint members 110 and the nut 130 to isolate the turning of the nut 130 from the joint members 110. As depicted in FIG. 2B, as the nut 130 is rotated and tightened onto the threaded shank 124 of the bolt 120, the protuberances 30 are forced into the indentations 40. Tightening is stopped once the gap between the head 122 of the bolt 120 and the prior art DTI washer 10 disappears or is reduced to a desired distance which indicates the desired amount of tension in the threaded shank 124. The dimensions and material properties of the prior art DTI washer 10 determine how much tension is required to force the protuberances 30 back into the indentations 40. The indentations 40 may be at least partially filled as a result of the protuberances 30 being forced back into the annular body 20, and perform no useful function in the operation of the prior art DTI washer 10. Rather, the indentations 40 are a result of the displacement of material during the forming operation which creates the protuberances 30.

As depicted in FIG. 2C, which shows the DTI washer 10 within inset 2C of FIG. 2A, in ideal operation of the prior art DTI washer 10, the web 50 of the prior art DTI washer 10 is supported from below by the adjacent joint member 110. In embodiments where the holes in the joint members 110 exceed the diameter permitted by code, the web 50 would be supported be a washer or plate (not shown). Recent code changes specify larger holes, however, without requiring a washer or plate. In some cases, the bolt hole may also be enlarged or oversized due to reaming or chamfering of the hole opening.

Referring to FIGS. 3A-3C, the code changes specifying larger bolt holes have negative effects on the performance of the prior art DTI washers 10. FIG. 3A depicts the prior art DTI washer 10 positioned adjacent to joint members 210 having larger bolt holes than the bolt holes in the joint members 110 (FIGS. 2A-2C). The bolt holes in the joint members 210, which previously would have been classified as "oversized" and would have been required to by covered by a washer or plate with smaller "normal sized" holes, are now permitted without a washer or plate by the latest code revisions. As depicted in FIG. 3B, which shows the prior art DTI washer 10 within inset 3B of FIG. 3A, the larger holes in the joint members 210 result in the web 50 no longer being supported, or fully supported, by the joint members 210. As depicted in FIG. 3C, tightening of the bolt 120 may result in unpredictable deformation of the DTI washer 10 into the holes because the web 50 is not supported. This deformation may result in the gap between the head 122 of the bolt 120 and the prior art DTI washer 10 disappearing despite proper tension not being applied to the bolt 120. It is therefore desirable to provide a new DTI washer design which is capable of operating when placed over an enlarged hole without the risk of unpredictable and undesirable deformation.

SUMMARY

According to one embodiment, a direct tension indicating (DTI) washer is provided including an annular body having a central hole, one or more protuberances, and one or more indentations which correspond to the one or more protuberances. The one or more protuberances are integral with the annular body, and are struck and partially sheared from the annular body to project from a first face of the annular body and leave the one or more corresponding indentations in a second face of the annular body opposite the first face. The one or more indentations are offset from the one or more protuberances and located farther from the central hole of the annular body than the one or more protuberances.

According to another embodiment, a joint assembly is provided including at least one joint member, a DTI washer disposed adjacent to the at least one joint member, a first bearing member on a first side of the at least one joint member, and a second bearing member on a second side of the at least one joint member. The DTI washer includes an annular body having a central hole aligned with a hole in the at least one joint member and one or more protuberances integral with the annular body which are struck and partially sheared from the annular body to project from a first face of the annular body. The one or more protuberances leave one or more corresponding indentations in a second face of the annular body opposite from the first face which are offset from the one or more protuberances and located farther from the central hole of the annular body than the one or more protuberances. The first and second bearing members are attached to or loosely disposed around a shaft positioned in the hole of the at least one joint member and the central hole of the annular body, such that the first bearing member has a bearing surface in contact with the one or more protuberances of the DTI washer and the second bearing member has a bearing surface in contact with the second side of the at least one joint member.

According to another embodiment, a DTI washer includes an annular body having a central hole, an annular protuberance, and an annular indentation which is offset from the annular protuberance and is located farther from the central hole of the annular body than the annular protuberance. The annular protuberance is integral with the annular body, and is struck and partially sheared from the annular body to project from a first face of the annular body and leave the corresponding annular indentation in a second face of the annular body opposite the first face.

BRIEF DESCRIPTION OF DRAWING

The invention is best understood from the following detailed description when read in conjunction with the accompanying drawing. It is emphasized that, according to common practice, the various features of the drawing are not to scale. On the contrary, the various features are arbitrarily expanded or reduced for clarity. Included in the drawing are the following figures:

FIG. 1A is a top view of a prior art direct tension indicating (DTI) washer;

FIG. 1B is a bottom view of the prior art DTI washer of FIG. 1A;

FIG. 1C is a cross-sectional view of the prior art DTI washer of FIG. 1A;

FIG. 6A is a cross sectional view of another joint assembly including the DTI washer of FIG. 4A, according to an embodiment of the present invention;

FIG. 6B is a cross sectional view of another joint assembly including the DTI washer of FIG. 4A, according to an embodiment of the present invention;

DETAILED DESCRIPTION

Figure 2A:
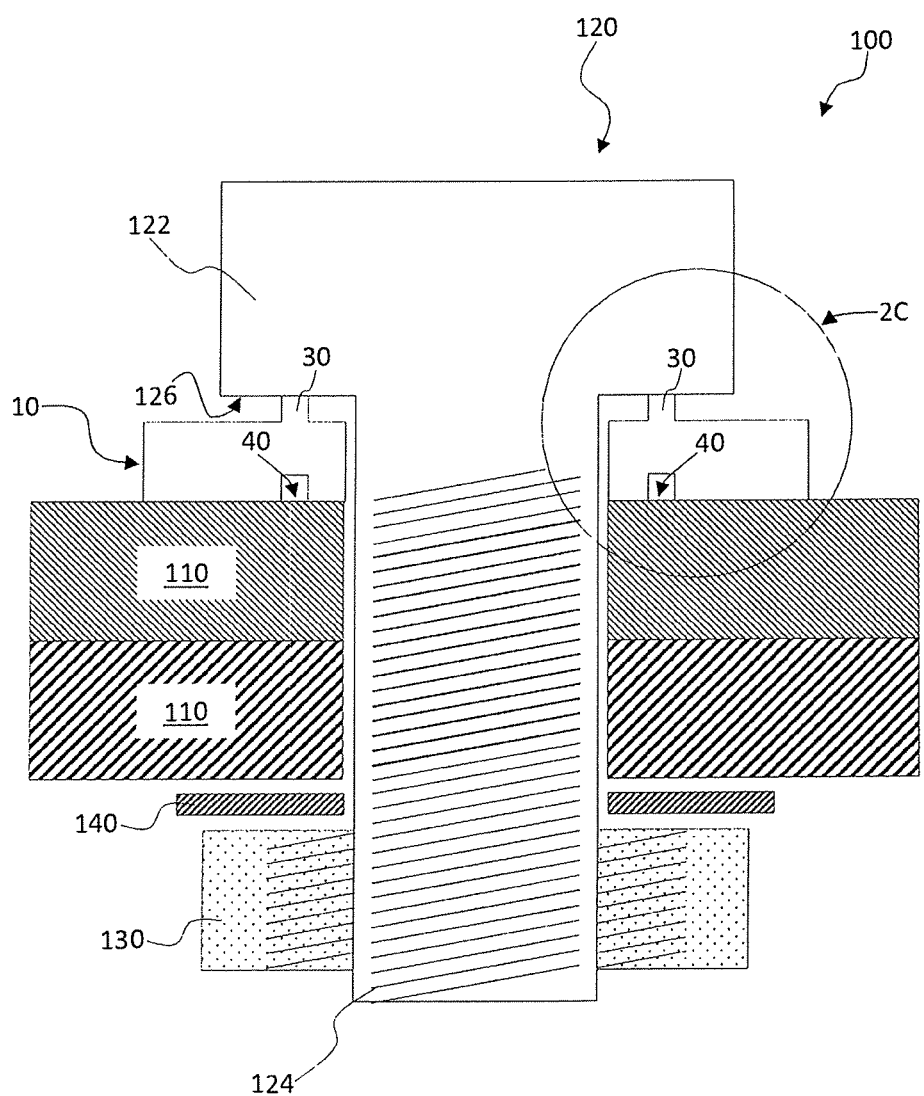
FIG. 2A is a side view of a joint assembly including the prior art DTI washer of FIG. 1A.
Figure 2B:
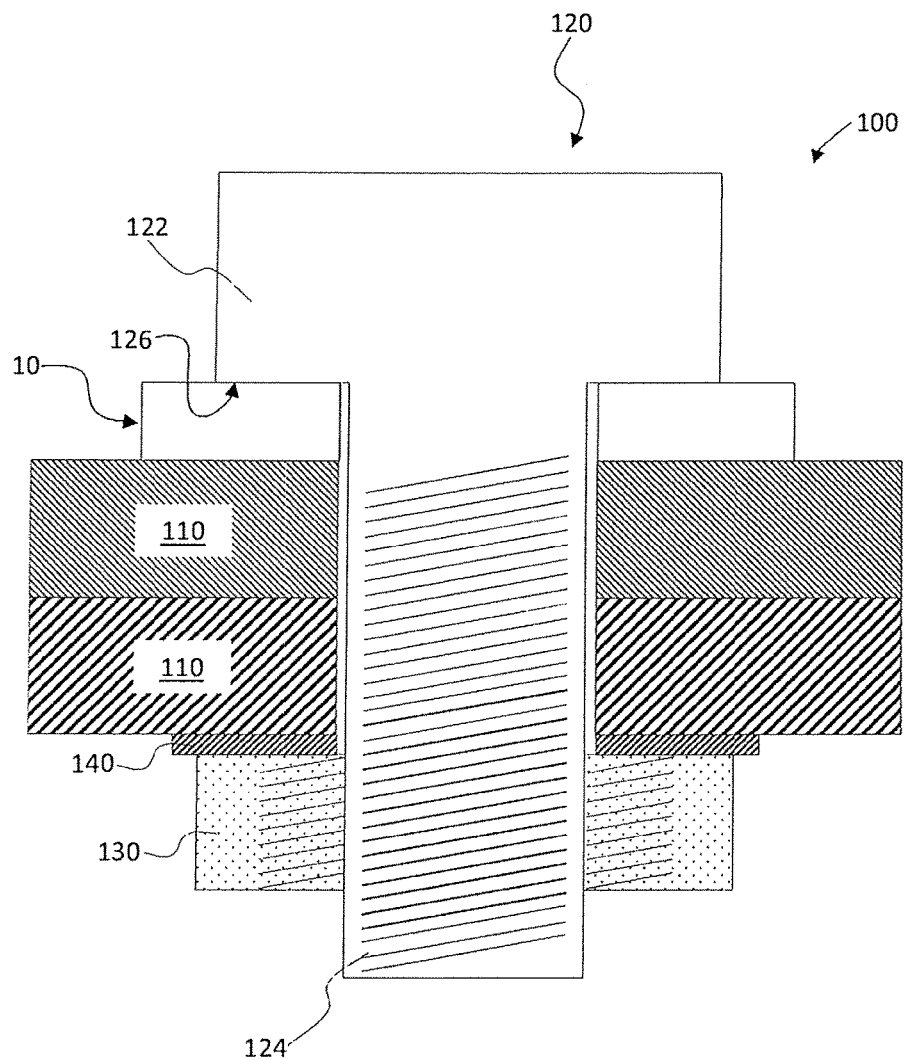
FIG. 2B is a side view of the joint assembly of FIG. 2A after the joint assembly has been tightened to collapse the protuberances of the prior art DTI washer.
Figure 2C:
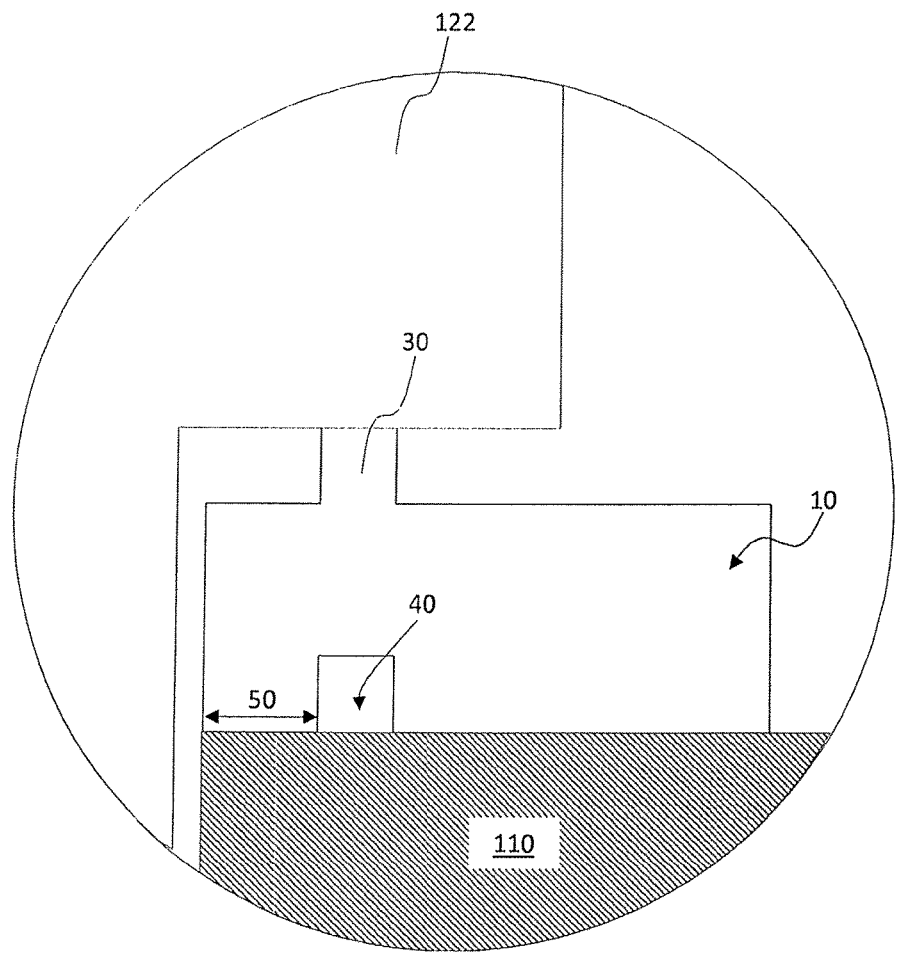
FIG. 2C is an inset side view of the joint assembly of FIG. 2A.
Figure 3A:
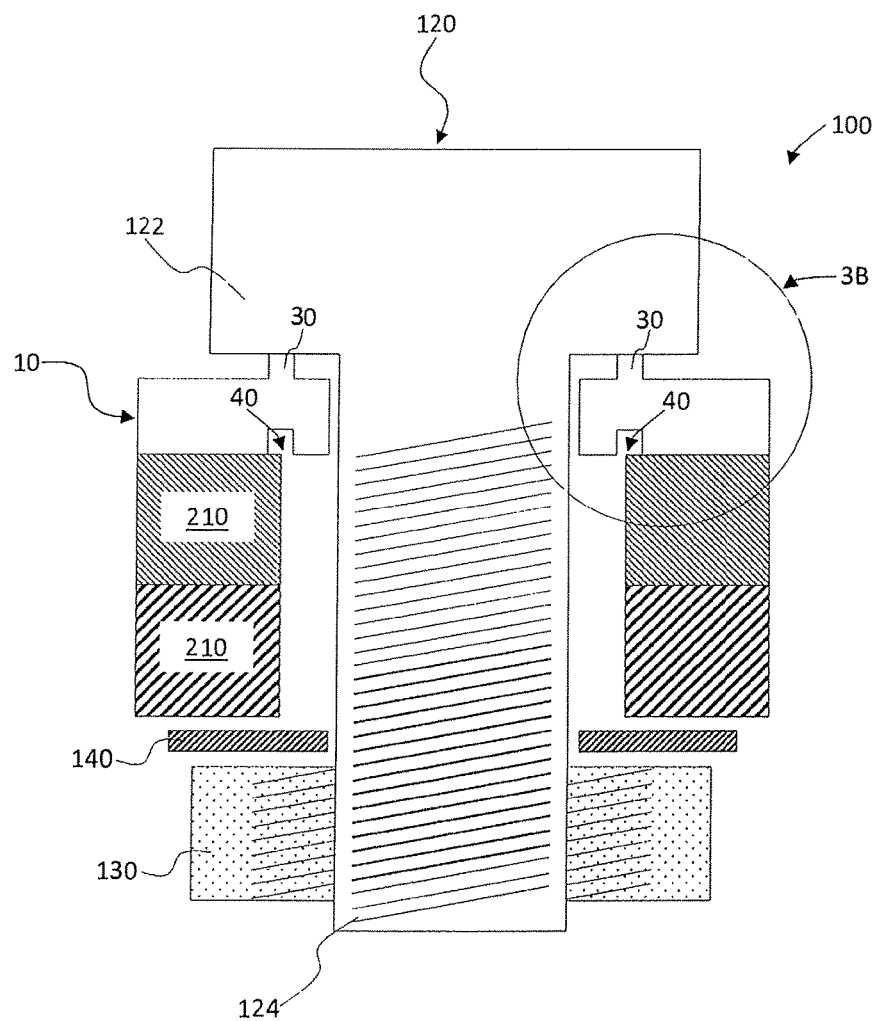
FIG. 3A is a side view of another joint assembly including the prior art DTI washer of FIGS. 1A-1C.
Figure 3B:
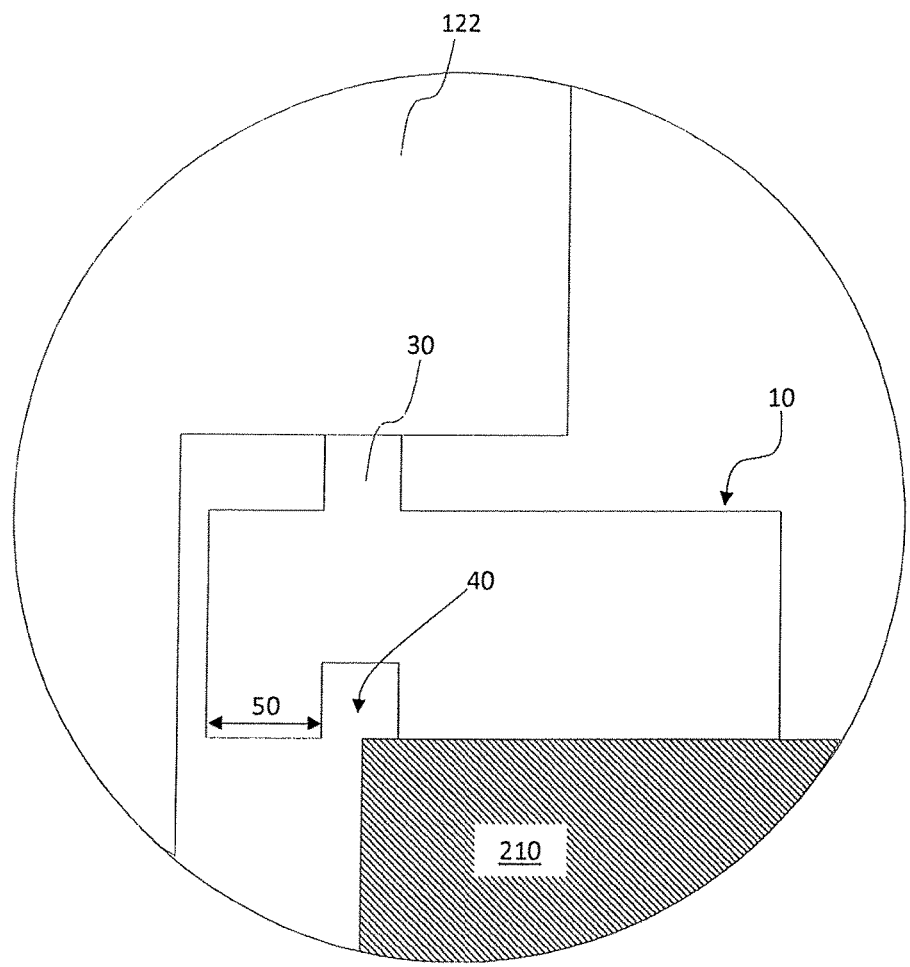
FIG. 3B is an inset side view of the joint assembly of FIG. 3A.
Figure 3C:
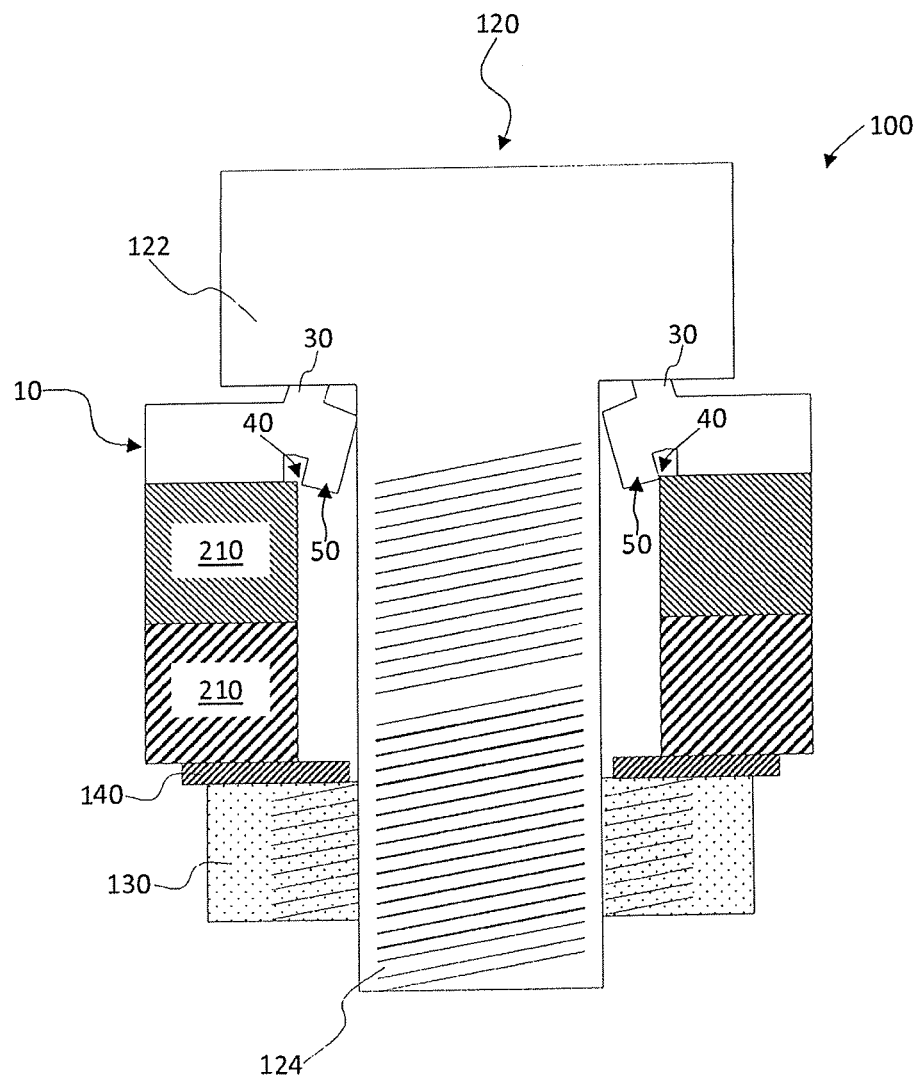
FIG. 3C is a side view of the joint assembly of FIG. 3A after the joint assembly has been tightened resulting in unwanted deformation of the prior art DTI washer.

Referring now to the drawing, in which like reference numbers refer to like elements through the various figures that comprise the drawing, FIGS. 4A-4D illustrate an exemplary embodiment of a direct tension indicating (DTI) washer 400 having offset protuberances and indentations. Offsetting the protuberances and indentations improves mechanical strength of the DTI washer 400, particularly when employed around a bolt inserted into an enlarged hole in one or more joint members.

Figure 4A:
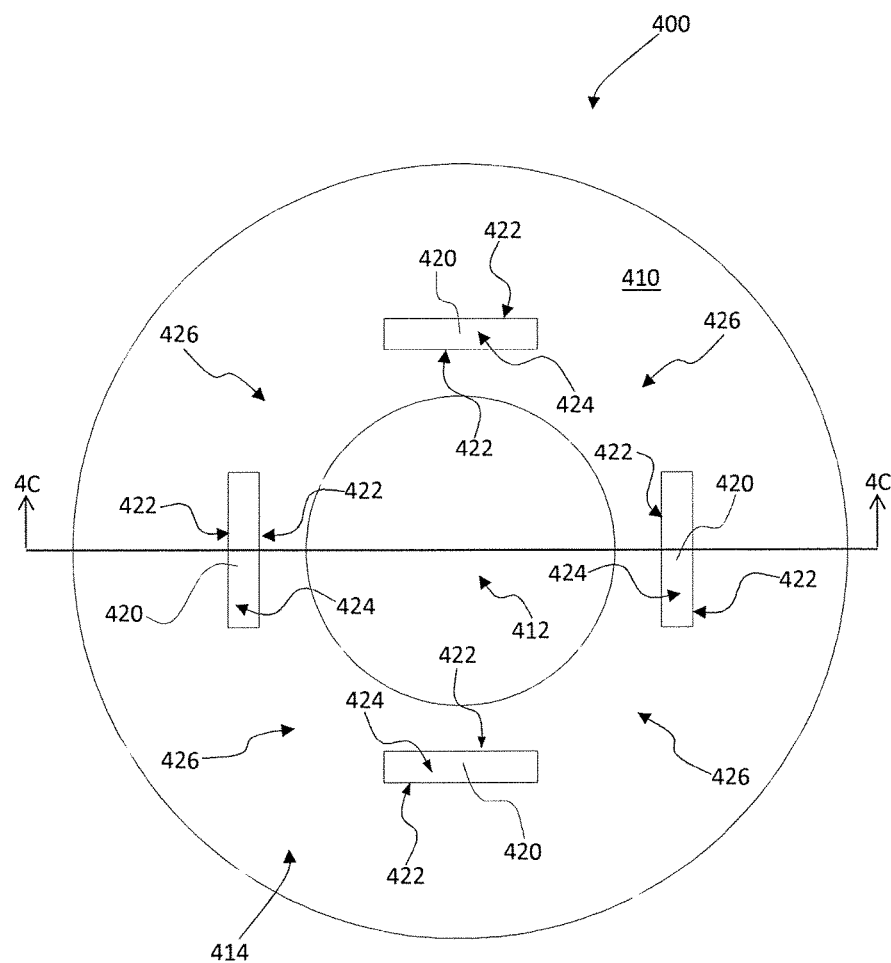
FIG. 4A is a top view of a DTI washer having offset protuberances and indentations, according to an embodiment of the present invention.
Figure 4B:
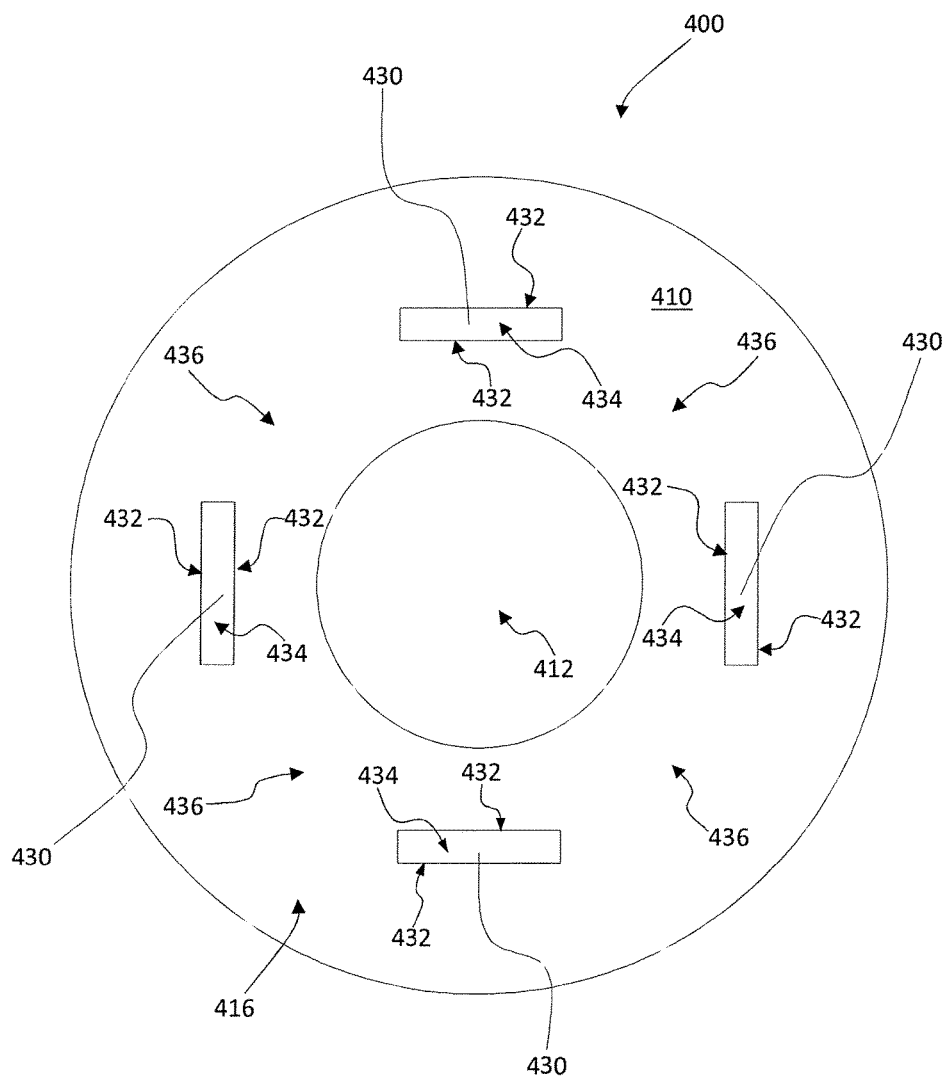
FIG. 4B is a bottom view of the DTI washer of FIG. 4A.
Figure 4C:
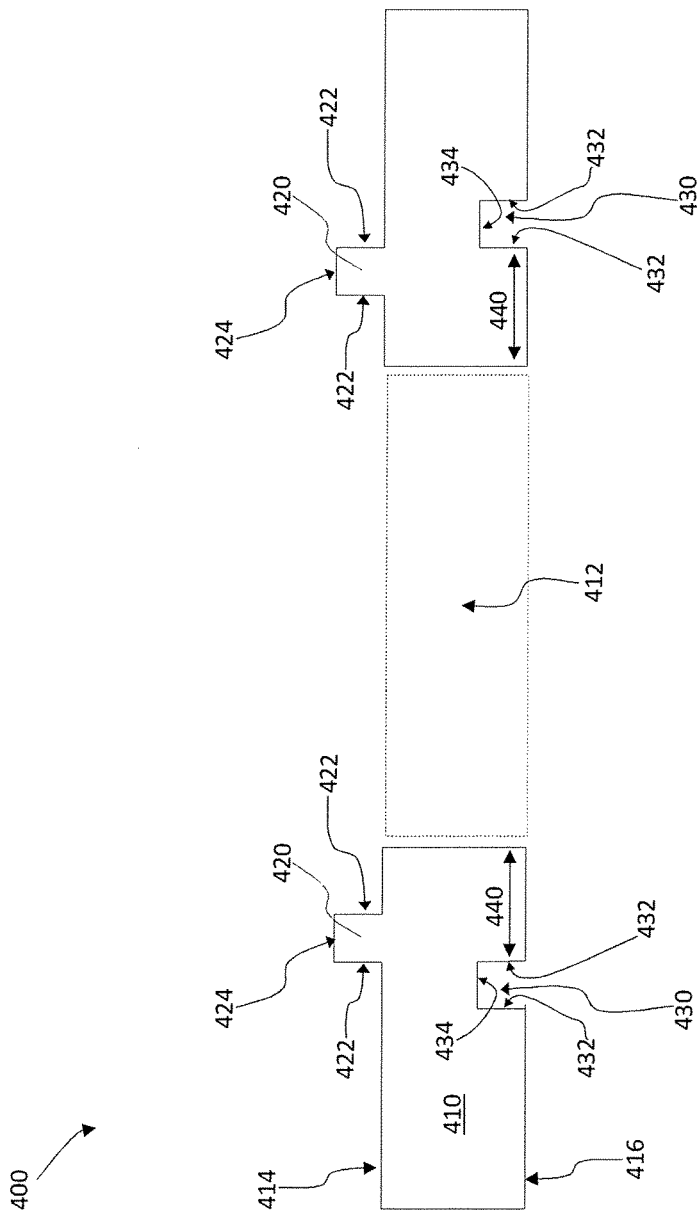
FIG. 4C is a cross-sectional view of the DTI washer of FIG. 4A.

Referring to FIGS. 4A-4D, the DTI washer 400 includes an annular body 410 surrounding a central hole 412. FIG. 4A is a top view of the DTI washer 400, FIG. 4B is a bottom view of the DTI washer 400, and FIG. 4C is a cross sectional view of the DTI washer 400 along line 4C-4C of FIG. 4A. The DTI washer 400 further includes a plurality of protuberances 420 integral with the annular body 410. The protuberances 420 are struck from and sheared from the annular body 410 to project from a first face 414 of the annular body 410 and leave a corresponding plurality of indentations 430 in a second face 416 of the annular body 410 opposite from the first face 414. By integral, it is meant that the annular body 410 and the protuberances 420 are made of a single piece or a single unitary part without additional pieces. Each protuberance 420 is defined by a pair of outer sidewalls 422 extending away from the first face 414 of the annular body 410 and an outer surface 424 extending between the pair of outer sidewalls 422 and between two spaced regions 426 of the first face 414. Each indentation 430 is defined by a pair of inner sidewalls 432 extending partially through the annular body 410 from the second face 416, and from which the pair of the outer sidewalls 422 have been sheared, and an inner surface 434 extending between the pair of inner sidewalls 432 and between two spaced regions 436 of the second face 416. The region of the annular body 410 between the indentations 430 and the central hole 412 is defined as the web 440. In the embodiment depicted in FIGS. 4A-4D, the protuberances 420 and indentations 430 may be rectangular and straight in outline, with outer sidewalls 422 and inner sidewalls 432 substantially tangential to circles concentric with the central hole 412 and substantially perpendicular to the first face 414 and the second face 416, respectively. As described in more detail below, however, other embodiments may include protuberances and indentations having any suitable shape and size. Typically, the protuberances 420 and the indentations 430 are spaced at regular intervals around the central hole 412. There is no limit on the number of protuberances 420 and corresponding indentations 430 that may be included in the DTI washer 400. Although the embodiments depicted in FIGS. 4A-4D include four pairs of protuberances 420 and corresponding indentations 430, other embodiments may include one, two, three, or five or more pairs of protuberances 420 and indentations 430. Specifically, an embodiment including a single annular protuberance is described in more detail below in conjunction with FIGS. 10A-10D.

Figure 4D:
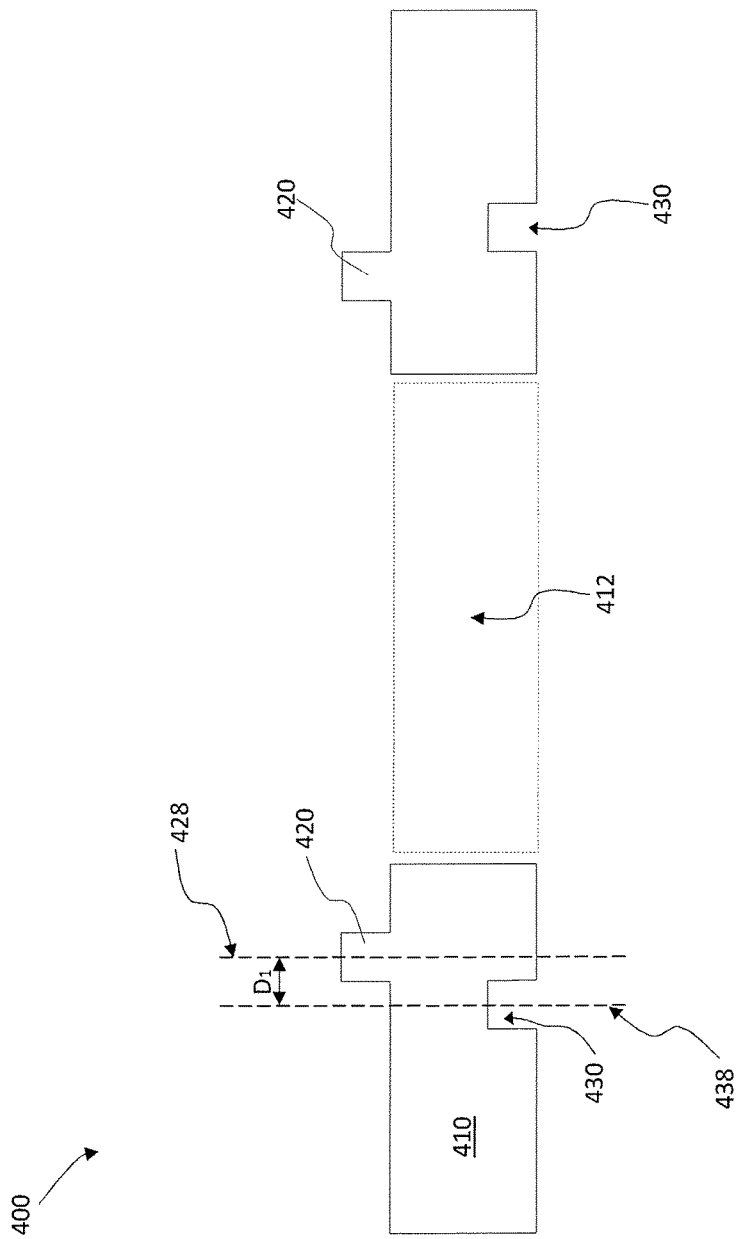
FIG. 4D is another cross-sectional view of the DTI washer of FIG. 4A.

As depicted in FIG. 4D, the DTI washer 400 is further defined by the indentations 430 being offset from the protuberances 420 and being positioned farther away from the central hole 412. The protuberances 420 are offset from the indentations 430 by a distance $D_1$, which is equal to the distance between a center line 428 of a protuberance 420 and a center line 438 of a corresponding indentation 430. The distance $D_1$, which indicates the degree of offset, will vary with the overall size and thickness of the DTI washer 400, as well as the specific application for which it is intended. Experimental results have indicated that DTI washers 400 having a thickness of 0.158 inches (4.0 mm) may be fabricated with offsets ranging from 0.001 inches (0.025 mm) to 0.04 inches (1.0 mm) with no deleterious effects, as indicated by the following table.

TABLE 1

| Protuberance Height | Offset distance | Force required to compress protuberances |
|---|---|---|
| 0.047 inches (1.19 mm) | 0.00 inches (0 mm) | 55.0 kips (244.65 kN) |
| 0.047 inches (1.19 mm) | 0.02 inches (0.51 mm) | 53.6 kips (238.42 kN) |
| 0.047 inches (1.19 mm) | 0.03 inches (0.76 mm) | 53.6 kips (238.42 kN) |
| 0.054 inches (1.37 mm) | 0.00 inches (0 mm) | 57.8 kips (257.11 kN) |
| 0.054 inches (1.37 mm) | 0.02 inches (0.51 mm) | 56.8 kips (252.66 kN) |
| 0.053 inches (1.35 mm) | 0.03 inches (0.76 mm) | 57.8 kips (257.11 kN) |

In other words, the degree of the offset may be, for example, at least approximately 25% of the thickness of the annular body 410. In other embodiments, the degree of offset may be greater than 25%. It will be noted, however, that embodiments are not limited to these offsets and that the offset may be lesser or greater than the offset measurements specifically disclosed. It is also noted that the degree of offset is exaggerated in FIGS. 4A-4D for illustrative simplicity.

Preferably, the DTI washer 400 is manufactured by an offset extrusion process in which the punch which forms the indentations 430 is intentionally not aligned with the die which forms the protuberances 420. Use of such an offset extrusion process is traditionally undesirable because the off-center extruding causes unequal forces on the manufacturing equipment, which is associated with reduced tooling life, excessive tooling wear, and tooling failure.

Figure 5A:
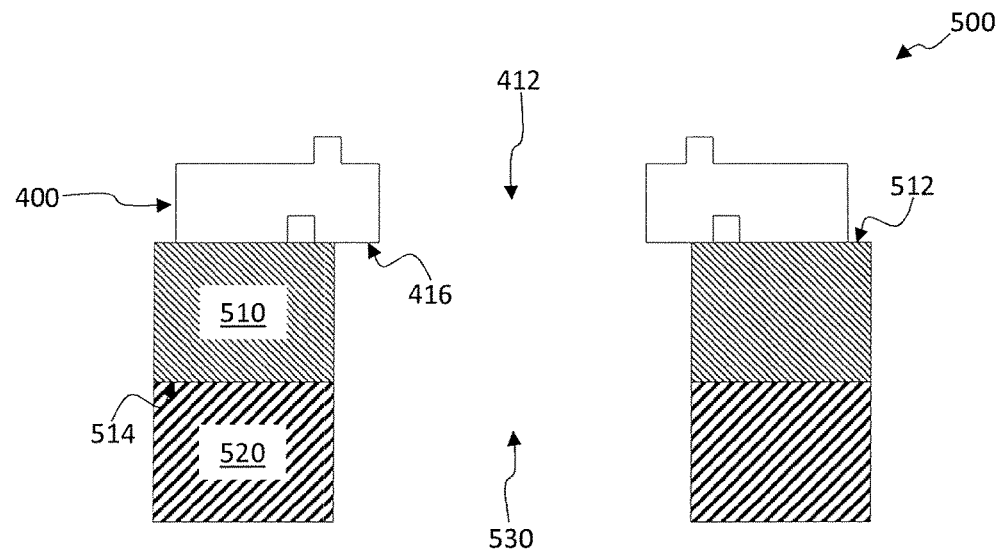
FIG. 5A is a cross-sectional view of a joint assembly including the DTI washer of FIG. 4A, according to an embodiment of the present invention.

The use of the DTI washer 400 constructed in accordance with the embodiments described above is illustrated in FIGS. 5A-5D. As depicted in FIG. 5A, a joint assembly 500 includes one or more adjacent joint members, for example a first joint member 510 adjacent to a second joint member 520. It will be understood that "adjacent" as used herein does not mean directly adjacent. In other words, one or more additional elements may be disposed between the first joint member 510 and the second joint member 520, for example a third joint member, a space, etc. The joint assembly 500 further includes a hole 530 formed through the first joint member 510 and the second joint member 520. The hole 530 may be formed in the first joint member 510 and the second joint member 520 independently or simultaneously, and the hole 530 may have a uniform or non-uniform diameter. For example, the hole 530 may have a larger or smaller diameter in the first joint member 510 than in the second joint member 520. The DTI washer 400 described above is placed on the first joint member 510 with the second face 416 of the DTI washer 400 adjacent to a bearing surface 512 of the first joint member 510. The bearing surface 512 is the surface of the first joint member 510 opposite a second surface 514 adjacent to the second joint member 520. The central hole 412 of the DTI washer 400 is aligned with the hole 530. It will be understood that one or more washers, plates, or other elements may also be placed between the first joint member 510 and the DTI washer 400, but are not required.

Figure 5B:
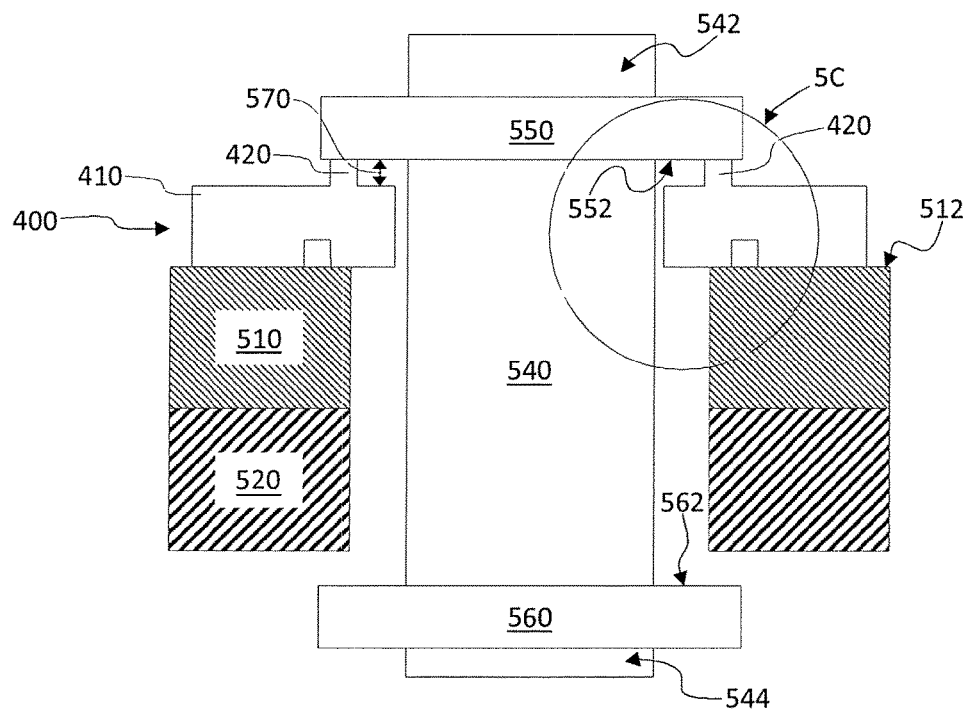
FIG. 5B is a cross-sectional view of a shaft inserted into the joint assembly of FIG. 5A, according to an embodiment of the present invention.

Referring to FIG. 5B, a shaft 540 is inserted through the hole 412 in the DTI washer 400 and the hole 530 in the first joint member 510 and the second joint member 520. A first bearing member 550 is positioned on a first end 542 of the shaft 540 adjacent to the DTI washer 400 and a second bearing member 560 is positioned on a second end 544 of the shaft 540 adjacent to the second joint member 520. The first bearing member 550 has a bearing surface 552 in contact with the protuberances 420 of the DTI washer 400. The second bearing member 560 has a bearing surface 562 adjacent to the second joint member 520. The protuberances 420 result in a gap 570 between the annular body 410 of the DTI washer 400 and the bearing surface 552 of the first bearing member 550.

Figure 6C:
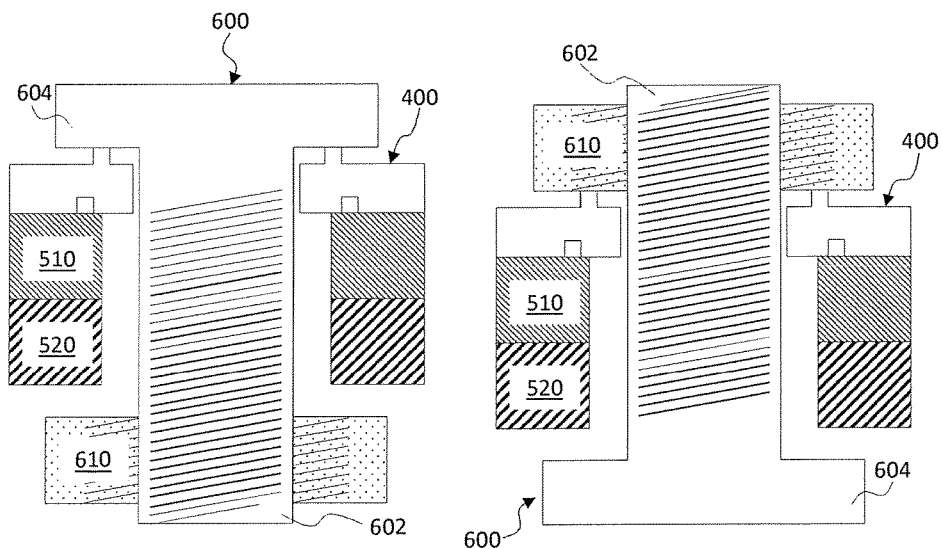
FIG. 6C is a cross sectional view of another joint assembly including the DTI washer of FIG. 4A, according to an embodiment of the present invention.
Figure 6C:
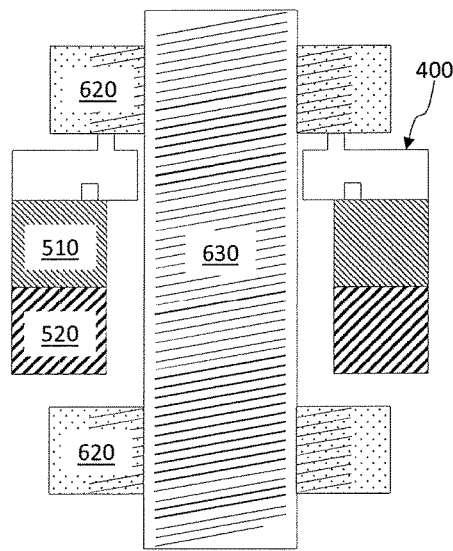

At least one of the first bearing member 550 and the second bearing member 560 is movable with respect to the shaft 540. In some embodiments, either the first bearing member 550 or the second bearing member 560 may be permanently affixed to or integral with the shaft 540. For example, in an embodiment depicted in FIG. 6A, the shaft 540 and the first bearing member 550 may be the shank 602 and the head 604 of a bolt 600, respectively. The shank 602 may be externally threaded and the second bearing member 560 is an internally threaded nut 610 which screws onto the shank 602. In another embodiment depicted in FIG. 6B, the orientation of the bolt 600 is reversed so that the second bearing member 560 is the head 604 of the bolt 600 and the first bearing member is the nut 610. In another embodiment depicted in FIG. 6C, both the first bearing member 550 and the second bearing member 560 are internally threaded nuts 620 which screw on to an externally threaded shaft 630. In other embodiments, one or both of the first bearing member 550 and the second bearing member 560 are washers or plates which are loosely disposed around the shaft 540, for example to isolate the turning of either the first bearing member 550 or the second bearing member 560 from the first joint member 510 or the second joint member 520, respectively. In such embodiments, at least one additional bearing member (not shown) which is removably affixed to, permanently affixed to, or integral with the shaft 540 is also included which secures the washer or plate, such as the head of a bolt or a nut.

Figure 5C:
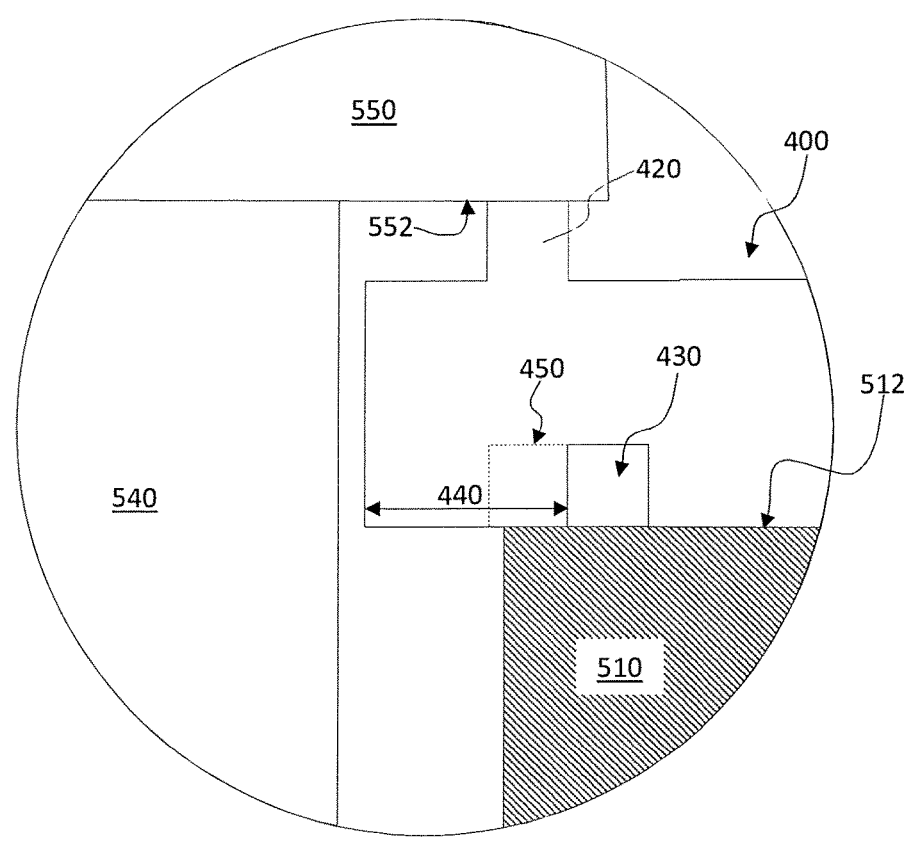
FIG. 5C is another cross-sectional view of the shaft inserted into the joint assembly of FIG. 5A, according to an embodiment of the present invention.

As depicted in FIG. 5C, which shows the DTI washer 400 within inset 5C of FIG. 5B, because the indentations 430 are offset from the protuberances 420, the web 440 of the DTI washer 400 is supported from below by the bearing surface 512 of the first joint member 510. Outline 450 shows the location of the indentation 430 were it not offset from the protuberance 420. As can be seen from the outline 450, the web 440 would not be supported if not for the offset.

Figure 5D:
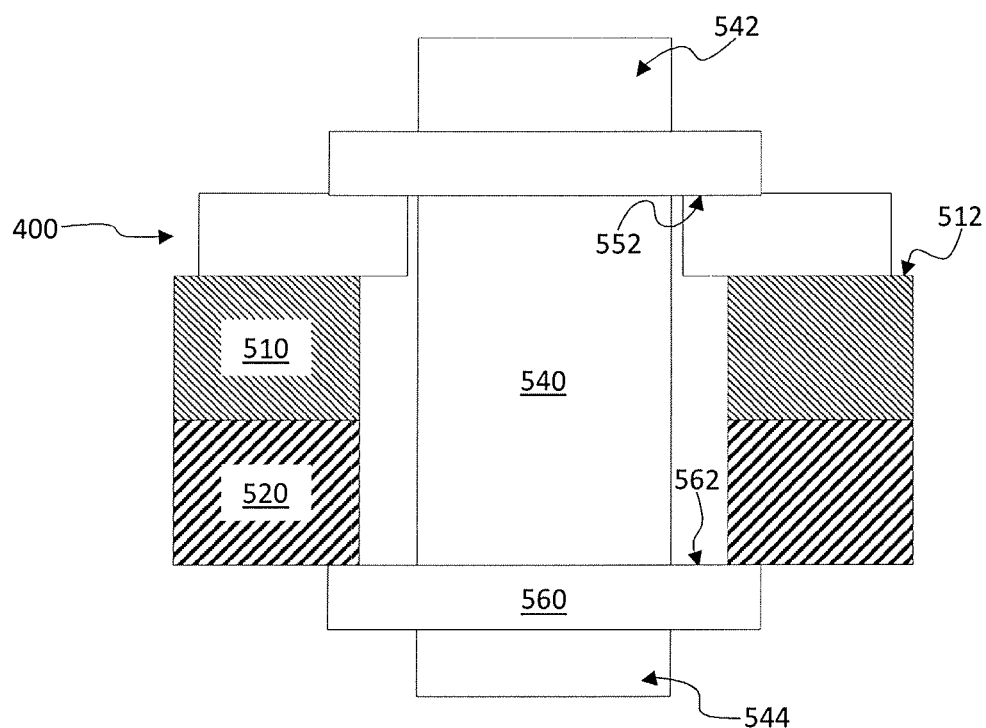
FIG. 5D is a cross-sectional view of the joint assembly of FIG. 5B after being tightened, according to an embodiment of the present invention.

As depicted in FIG. 5D, as the joint assembly 500 is tightened by bringing the first bearing member 550 and the second bearing member 560 together, the DTI washer 400 is compressed between the first bearing member 550 and the first joint member 510. This compression forces the protuberances 420 back into the indentations 430. When the protuberances 420 are forced back into the indentations 430, the gap 570 is reduced by a desired amount or disappears, indicating that proper tension has been attained in the joint assembly 500. Because the web 440 is supported, unpredictable and undesirable deformation of the DTI washer 400 is avoided before the desired tension is achieved.

It has been discovered that offsetting the indentations 430 from the protuberances 420 improves the performance of the DTI washer 400 in at least three ways: (1) reducing the likelihood of unpredictable and undesirable deformation of the annular body 410, (2) changing the direction in which the protuberances 420 are compressed during tightening, and (3) preventing nesting.

Figure 7:
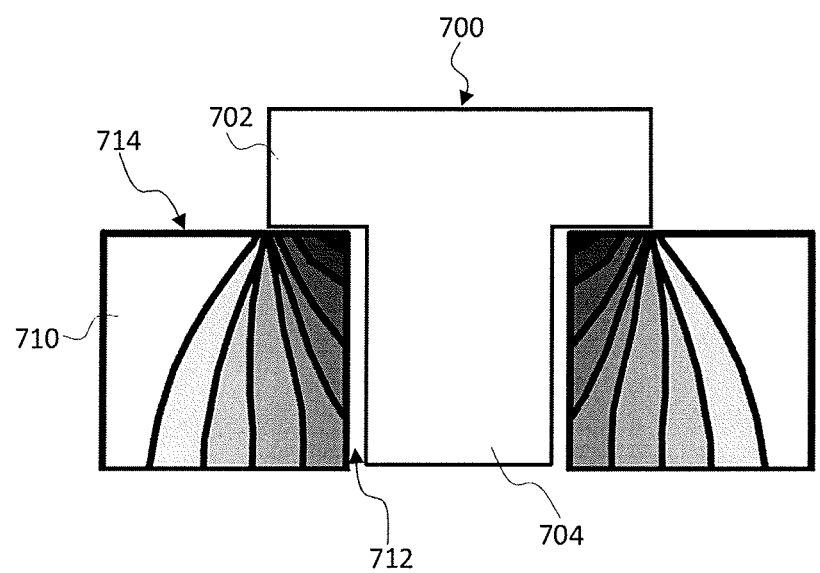
FIG. 7 is a cross-sectional view depicting the force applied to a joint member by a bolt.

First, as explained above, it has been discovered that by maximizing the area of the web 440, it is possible to maximize the strength of the DTI washer 400 and reduce the risk of unpredictable and undesirable deformation (i.e., deformation of the annular body 410 rather than of the protuberances 420). This advantage is described in conjunction with FIG. 7, which depicts a graphical approximation of the force applied to a joint member 710 including a hole 712 by a bolt 700, where the bolt 700 includes a shank 704 located in the hole 712 and a head 702 which is in contact with a top surface 714 of the joint member 710. In FIG. 7, the most heavily shaded regions indicate the regions of the joint member 710 experience the greatest force. As can be seen in FIG. 7, the bolt head 702 applies the greatest force beneath the bolt head 702 and nearest to the top surface 714 proximate to the hole 712. The force decreases as the distance from the bolt head 702 and the hole 712 increases. The dissipation of this force is sometimes described as a "pressure cone" beneath the bolt head 702. The design of the DTI washer 400 takes advantage of this force distribution to improve the performance of the DTI washer 400 in several ways. As previously discussed, offsetting the protuberances 420 and the indentations 430 increases the likelihood that the web 440 will be supported from below. Even in cases where the web 440 is not supported or not fully supported, however, offsetting the protuberances 420 and the indentations 430 still reduces the risk of unwanted deformation by moving the indentations 430 to a region of the annular body 410 which is subjected to less force. Further, increasing the size of the web 440 can prevent unwanted deformation of the central hole 412 because force that would be applied to the annular body 410 at the central hole 412 is instead spread over the web 440. It is necessary to offset the protuberances 420 and the indentations 430 because the positioning of the protuberances 420 is limited by the dimensions of the bearing surface of either the matching bolt or nut on which the DTI washer 400 is placed. In other words, the protuberances 420 must be located between the bearing surface of the bolt or nut and the adjacent joint member in order to be compressed between them. Typically, the protuberances of existing DTI washers are already located at or near the maximum possible distance away from the central hole 412 as possible and therefore cannot be moved farther away.

Second, offsetting the protuberances 420 and the indentations 430 further improves the design of the DTI washer 400 by modifying the direction in which the protuberances 420 are compressed during tightening. Because the protuberances 420 will tend to compress in the direction of the indentations 430, offsetting the indentations 430 causes the protuberances 420 to compress away from the central hole 412, reducing the risk that material from the DTI washer 400 will encroach upon the central hole 412 and reducing the risk of deformation of the interior diameter of the annular body 410. The extra pressure required to compress the protuberances 420 in a more outwardly radial direction also increases the strength of the protuberances 420, allowing for smaller protuberances 420 to be used for a given desired level of tension. Smaller protuberances 420 will also result in correspondingly smaller indentations 430, which will further increase web size and therefore also further increase the deformation resistance of the DTI washer 400.

Third, offsetting the protuberances 420 and the indentations 430 also prevents a plurality of DTI washers 400 from nesting (i.e., the protuberances 420 of one DTI washer 400 inserting into the indentations 430 of another DTI washer 400) which may permit easier formation, processing, coating or plating, packaging, handling, and shipping.

Figure 8A:
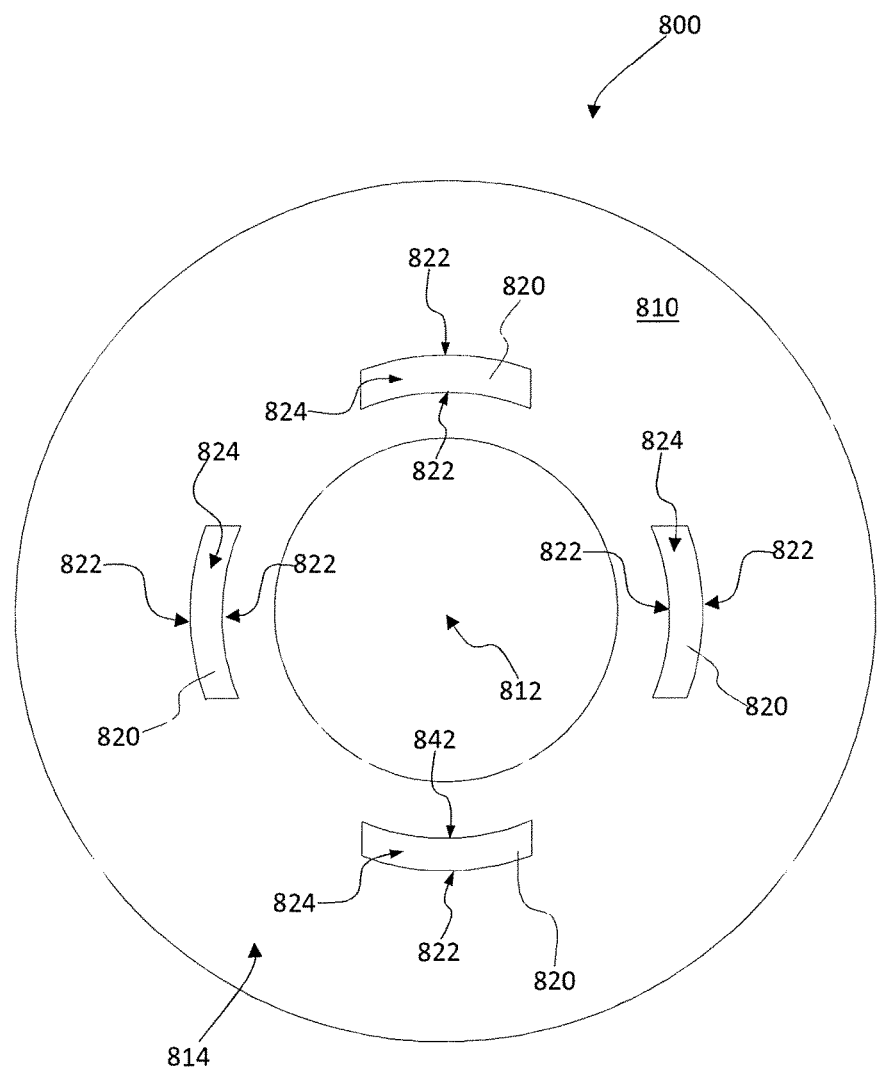
FIG. 8A is a top view of a DTI washer having offset, curved protuberances and indentations, according to another embodiment of the present invention.
Figure 8B:
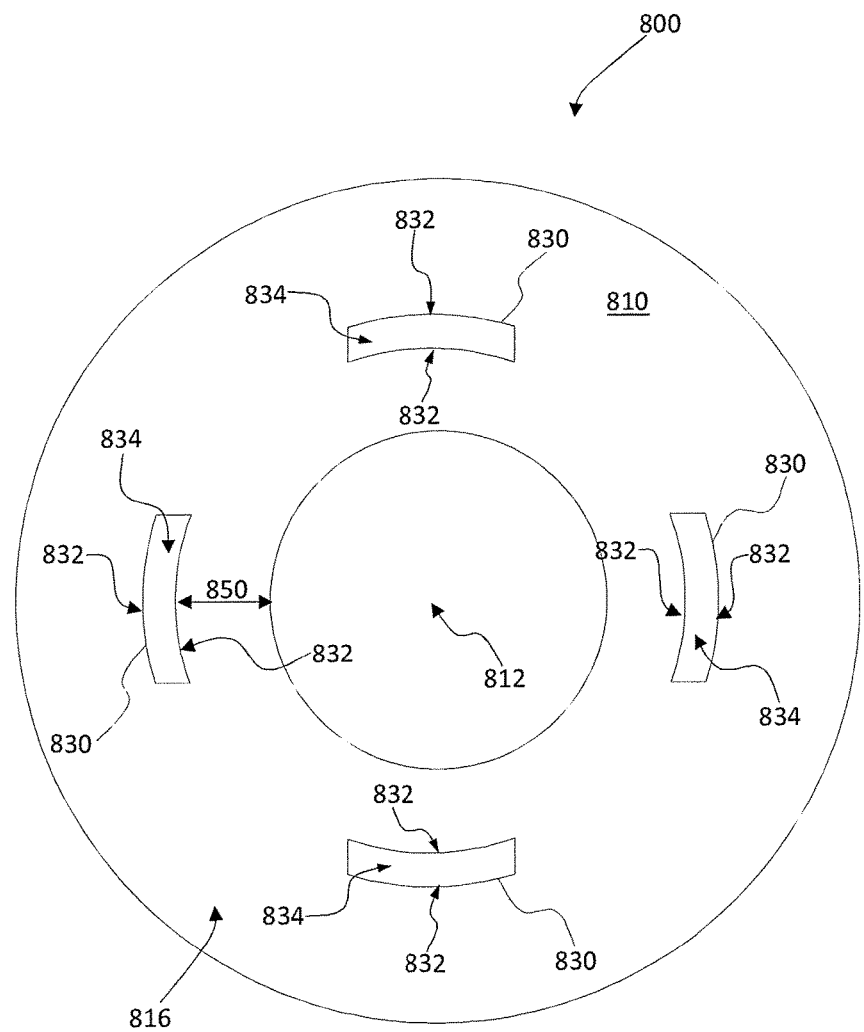
FIG. 8B is a bottom view of the DTI washer of FIG. 8A.

As previously stated, DTI washers according to embodiments of the present invention may include any number of protuberances and indentations, and the protuberances and indentations may have any suitable shape and size. Typically, the protuberances 420 and indentations 430 will be of approximately equal shape and dimension. In other embodiments, the protuberances 420 may be smaller than the indentations 430. For example, as depicted in FIGS. 8A and 8B, a DTI washer 800 includes an annular body 810 surrounding a central hole 812. FIG. 8A is a top view of the DTI washer 800, FIG. 8B is a bottom view of the DTI washer 800. The DTI washer 800 may include protuberances 820 and indentations 830 which are curved in outline, with outer sidewalls 822 and inner sidewalls 832 substantially concentric with the central hole 812. The protuberances 820 are struck from and sheared from the annular body 810 to project from a first face 814 of the annular body 810 and leave the corresponding plurality of indentations 830 in a second face 816 of the annular body 810 opposite from the first face 814. Curved protuberances further increase the size of the web 850 and improve the strength of the DTI washer 800 by moving the protuberances 820 farther from the hole 812 while still ensuring that no portion of the protuberances 820 extend radially beyond the head of the bolt, as described in greater detail in U.S. Pat. No. 5,667,346, incorporated herein by reference.

Figure 9:
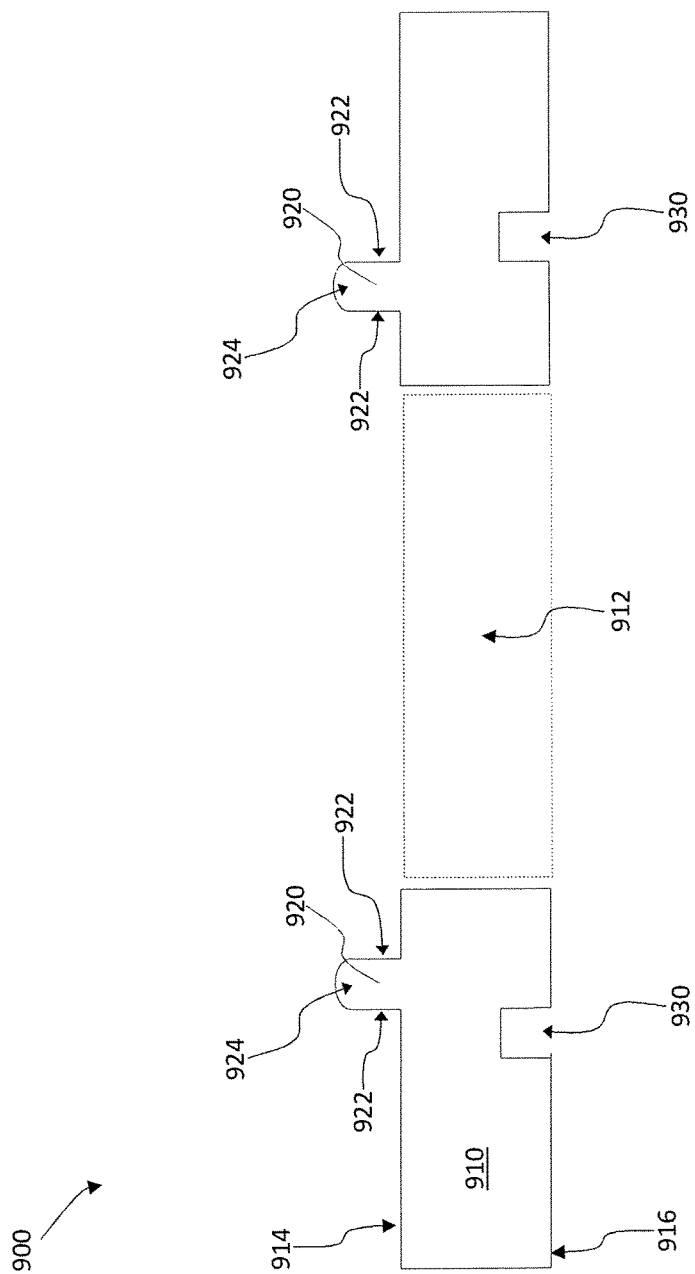
FIG. 9 is a cross-sectional view of a DTI washer having tapered protuberances, according to another embodiment of the present invention.

In another exemplary embodiment depicted in FIG. 9, a DTI washer 900 includes an annular body 910 surrounding a central hole 912. The DTI washer 900 further includes protuberances 920 that are tapered such that the mass is concentrated along a central region between the outer sidewalls 922. The protuberances 920 are struck from and sheared from the annular body 910 to project from a first face 914 of the annular body 910 and leave the corresponding plurality of indentations 930 in a second face 916 of the annular body 910 opposite from the first face 914. In the embodiment depicted in FIG. 9, the protuberances 920 are tapered by curving the outer surface 924. In other embodiments, the protuberances 920 may be tapered by angling the outer sidewalls 922 inward, for example. Such protuberances, and the advantages thereof, are described in greater detail in U.S. Pat. No. 5,370,483 and No. 5,487,632, also incorporated by reference. It will be understood that DTI washers according to embodiments of the present invention may have protuberances and indentations of other suitable shapes not described herein, and that it is not required that the protuberances and indentations have the same shape or dimensions.

Figure 10A:
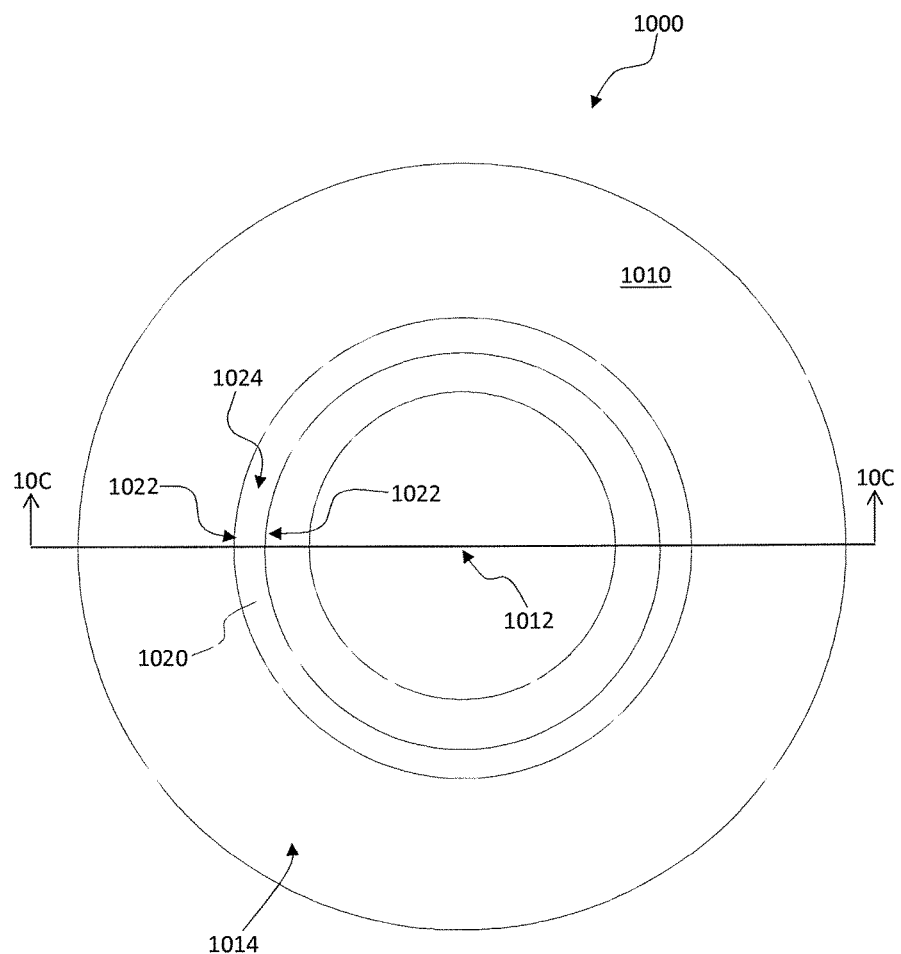
FIG. 10A is a top view of a DTI washer having an annular protuberance offset from an annular indentation, according to another embodiment of the present invention.
Figure 10B:
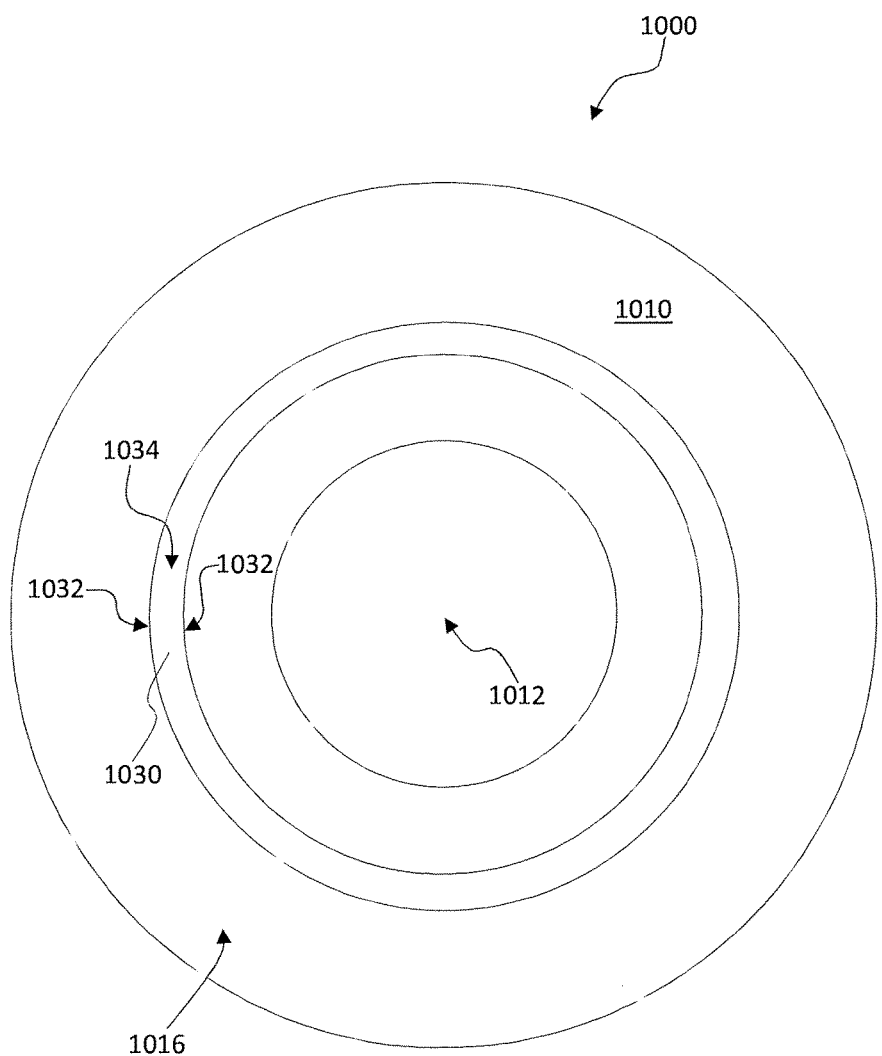
FIG. 10B is a bottom view of the DTI washer of FIG. 10A.
Figure 10C:
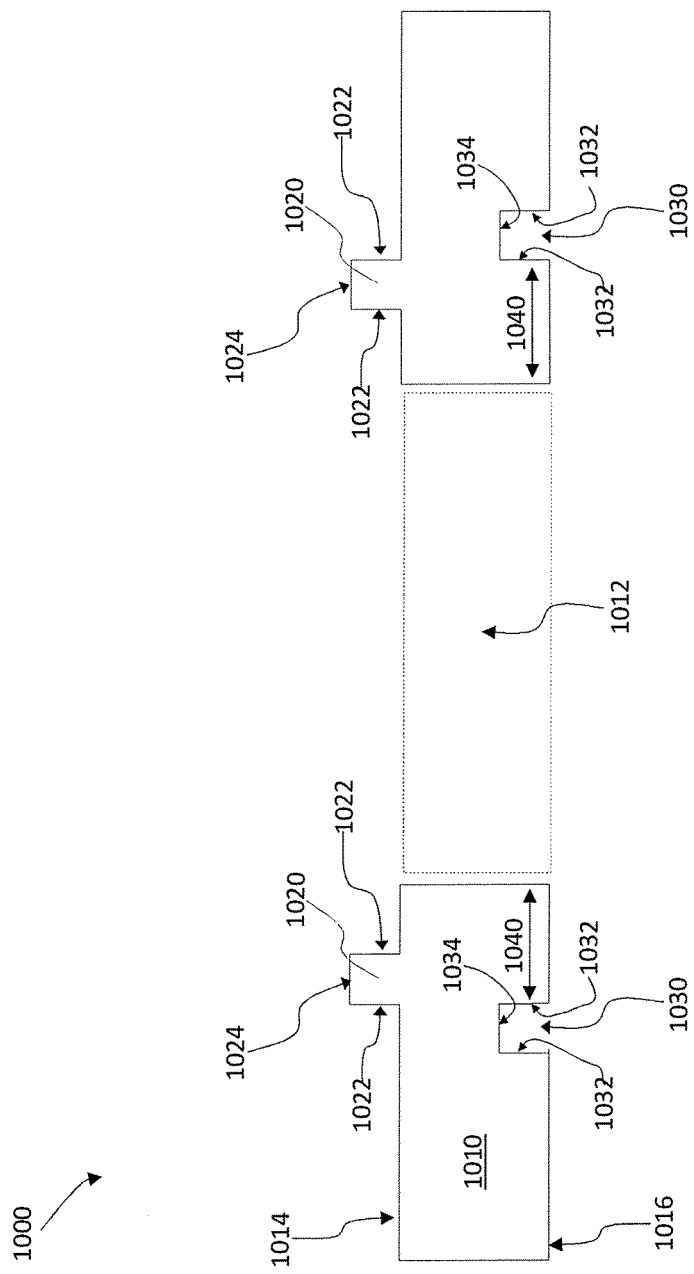
FIG. 10C is a cross-sectional view of the DTI washer of FIG. 10A.

Referring to FIGS. 10A-10C, a DTI washer 1000 is depicted according to another exemplary embodiment of the present invention. The DTI washer 1000 includes an annular body 1010 completely surrounding a central hole 1012. FIG. 10A is a top view of the DTI washer 1000, FIG. 10B is a bottom view of the DTI washer 1000, and FIG. 10C is a cross sectional view of the DTI washer 1000 along line 10C-10C of FIG. 10A. The DTI washer 1000 further includes an annular protuberance 1020 which fully surrounds, and is preferably concentric with, the central hole 1012. The annular protuberance 1020 is struck from and sheared from the annular body 1010 to project from a first face 1014 of the annular body 1010 and leave a corresponding annular indentation 1030 in a second face 1016 of the annular body 1010 opposite from the first face 1014. By integral, it is meant that the annular body 1010 and the annular protuberance 1020 are made of a single piece or a single unitary part without additional pieces. The annular protuberance 1020 is defined by a pair of outer sidewalls 1022 extending away from the first face 1014 of the annular body 1010 and an outer surface 1024 extending between the pair of outer sidewalls 1022. The annular indentation 1030 is defined by a pair of inner sidewalls 1032 extending partially through the annular body 1010 from the second face 1016, and from which the pair of the outer sidewalls 1032 have been sheared, and an inner surface 1034 extending between the pair of inner sidewalls 1032.

Figure 10D:
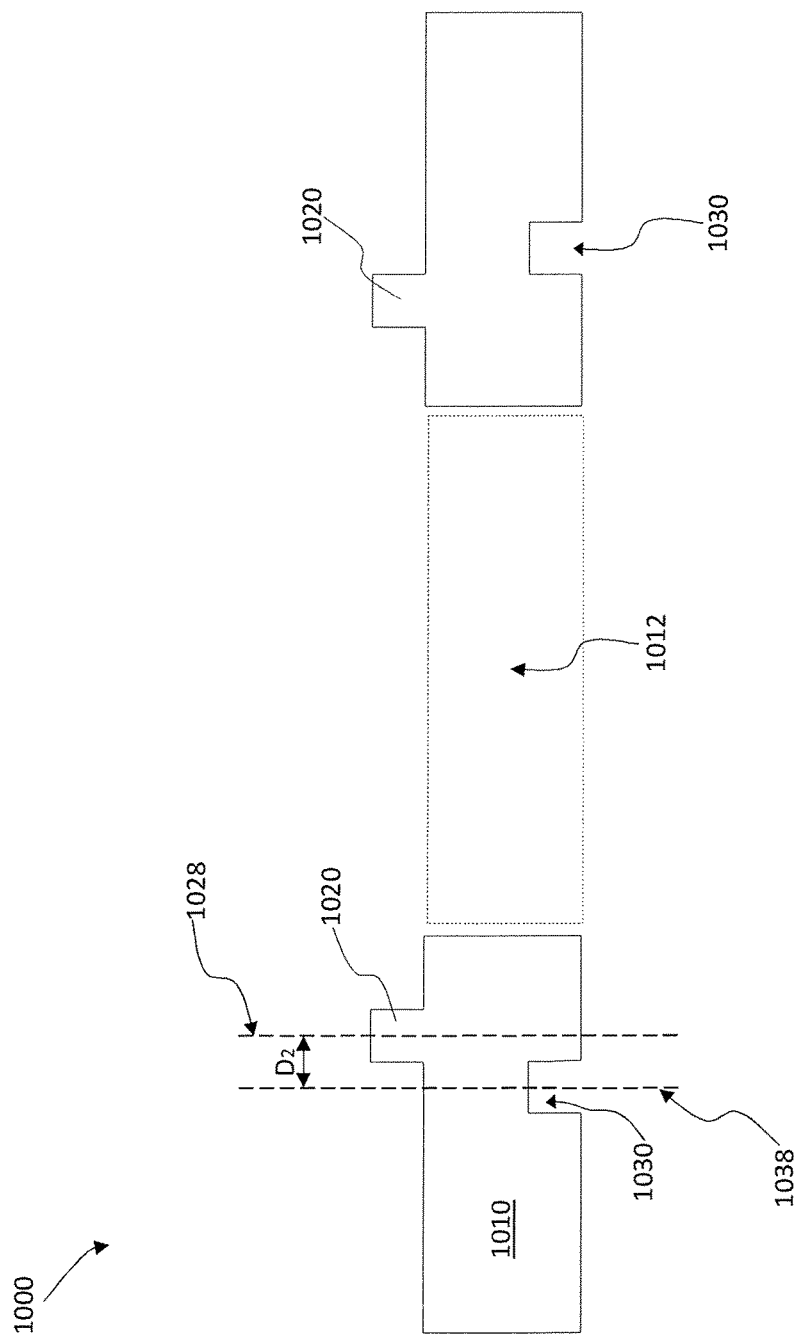
FIG. 10D is another cross-sectional view of the DTI washer of FIG. 10A.

Referring to FIG. 10D, which depicts the same cross-sectional view of the DTI washer 1000 as FIG. 10C, the annular indentation 1030 is offset from the annular protuberance 1020 by a distance $D_2$, which is equal to the distance between the center line 1028 of the annular protuberance 1020 and the center line 1038 of the annular indentation 1030. Like $D_1$ described above, $D_2$ will vary with the overall size and thickness of the DTI washer 1000, as well as the specific application for which it is intended. In exemplary embodiments, for an annular body 1000 with a thickness of 0.158 inches (4.0 mm), $D_2$ may range from 0.001 inches (0.025 mm) to 0.04 inches (1.0 mm), or be even greater than 0.04 inches (1.0 mm). In other words, $D_2$ may be, for example, at least approximately 25% of the thickness of the annular body 1010. As explained in greater detail above with respect to the DTI washer 400, there are performance increases for even very small degrees of offset, and the benefits of offsetting the annular protuberance 1020 from the annular indentation 1030 increase as $D_2$ increases. Preferably, $D_2$ is sufficiently large so that a portion of the web 1040 is supported by a surface adjacent to the second face 1016. In the event that the offset does not result in the web 1040 being fully supported, the offset still results in improved performance because of the reduced force applied to the DTI washer 1000 at the annular indentation 1030.

The foregoing description of preferred embodiments of the invention should be taken as illustrating, rather than as limiting, the present invention as defined by the claims. As will be readily appreciated, numerous variations and combinations of the features set forth above can be utilized without departing from the present invention as set forth in the claims. Such variations are not regarded as a departure from the spirit and scope of the invention, and all such variations are intended to be included within the scope of the following claims.

What is claimed:

1. A direct tension indicating washer for indicating the tension in a fastener comprising:
   an annular body including a planar first face, an opposing planar second face, and a central hole; and
   one or more protuberances integral with the annular body struck and partially sheared from the annular body to project from the first face of the annular body and leave one or more corresponding indentations in the second face of the annular body opposite from the first face,
   wherein each of the one or more protuberances is configured to collapse into the annular body to indicate tension, and
   wherein an area of the annular body between the one or more indentations and the central hole defines a web configured to be supported from below by a joint member having an enlarged or oversized opening, and
   wherein the one or more indentations are offset from the one or more protuberances and located farther from the central hole of the annular body than the one or more protuberances.

2. The direct tension indicating washer of claim 1, wherein each of the one or more protuberances are defined by (a) a pair of outer sidewalls extending away from the first face of the annular body; and (b) an outer surface extending between said pair of outer sidewalls and between two spaced regions of the first face of the annular body.

3. The direct tension indicating washer of claim 1, wherein each of the one or more indentations are defined by (a) a pair of inner sidewalls extending partially through the annular body from the second face of the annular body; and (b) an inner surface extending between the pair of inner sidewalls and between two spaced regions of the second face of the annular body.

4. The direct tension indicating washer of claim 1, wherein each of the one or more protuberances have a centerline, each of the one or more corresponding indentations have a centerline, and the distance between the centerline of each of the one or more protuberances and the centerline of the corresponding indentations is equal to, at least approximately 25% of the thickness of the annular body.

5. The direct tension indicating washer of claim 1, wherein each of the one or more protuberances are curved in outline.

6. The direct tension indicating washer of claim 1, wherein each of the one or more protuberances are tapered.

7. A direct tension indicating washer comprising:
an annular body including a central hole; and
one or more protuberances integral with the annular body struck and partially sheared from the annular body to project from a first face of the annular body and leave one or more corresponding indentations in a second face of the annular body opposite from the first face,
wherein the one or more indentations are offset from the one or more protuberances and located farther from the central hole of the annular body than the one or more protuberances, and wherein each of the one or more protuberances are rectangular in shape.

8. A joint assembly comprising:
at least one joint member having a hole;
a direct tension indicating washer disposed adjacent to the at least one joint member, the direct tension indicating washer having:
an annular body including a planar first face, an opposing planar second face, and a central hole aligned with the hole of the at least one joint member,
one or more protuberances integral with the annular body struck and partially sheared from the annular body to project from the first face of the annular body and leave one or more corresponding indentations in the second face of the annular body opposite from the first face,
wherein each of the one or more protuberances is configured to collapse into the annular body to indicate tension, and wherein an area of the annular body between the one or more indentations and the central hole defines a web configured to be supported from below by a joint member having an enlarged or oversized opening, and wherein the one or more indentations are offset from the one or more protuberances and located farther from the central hole of the annular body than the one or more protuberances;
a shaft in the hole of the at least one joint member and the central hole of the annular body;
a first bearing member either attached to the shaft or loosely disposed around the shaft on a first side of the at least one joint member, wherein the first bearing member has a bearing surface in contact with the one or more protuberances of the direct tension indicating washer; and
a second bearing member either attached to the shaft or loosely disposed around the shaft on a second side of the at least one joint member opposite the first side, wherein the second bearing member has a bearing surface in contact with the second side of the at least one joint member.

9. The joint assembly of claim 8, wherein the shaft is an externally threaded shank of a bolt, the first bearing member is a head of the bolt, the head is integral with the shank, and the second bearing member is an internally threaded nut removably attached to the shank.

10. The joint assembly of claim 8, wherein the shaft is an externally threaded shank of a bolt, the first bearing member is a washer loosely disposed around the shank of the bolt, and the bolt further comprises a head integral with the shank which holds the washer against the one or more protuberances.

11. The joint assembly of claim 8, wherein each of the one or more protuberances have a centerline, each of the one or more corresponding indentations have a centerline, and the distance between the centerline of each of the one or more protuberances and the centerline of the corresponding indentations is equal to, at least approximately 25% of the thickness of the annular body.

12. The joint assembly of claim 8, wherein the shaft is externally threaded and the first bearing member and the second bearing member are internally threaded nuts removably attached to the shaft.

13. The joint assembly of claim 8, wherein each of the one or more protuberances are curved in outline.

14. A joint assembly comprising:
at least one joint member having a hole;
a direct tension indicating washer disposed adjacent to the at least one joint member, the direct tension indicating washer having:
an annular body including a central hole aligned with the hole of the at least one joint member,
one or more protuberances each rectangular in shape and integral with the annular body struck and partially sheared from the annular body to project from a first face of the annular body and leave one or more corresponding indentations in a second face of the annular body opposite from the first face,
wherein the one or more indentations are offset from the one or more protuberances and located farther from the central hole of the annular body than the one or more protuberances;
a shaft in the hole of the at least one joint member and the central hole of the annular body;
a first bearing member either attached to the shaft or loosely disposed around the shaft on a first side of the at least one joint member, wherein the first bearing member has a bearing surface in contact with the one or more protuberances of the direct tension indicating washer; and
a second bearing member either attached to the shaft or loosely disposed around the shaft on a second side of the at least one joint member opposite the first side, wherein the second bearing member has a bearing surface in contact with the second side of the at least one joint member.

15. The joint assembly of claim 8, wherein each of the one or more protuberances are tapered.

16. A direct tension indicating washer for indicating the tension in a fastener comprising:
an annular body including a planar first face, an opposing planar second face, and a central hole; and
an annular protuberance integral with the annular body struck and partially sheared from the annular body to project from the first face of the annular body and leave a corresponding annular indentation in the second face of the annular body opposite from the first face, wherein the annular protuberance is configured to collapse into the annular body to indicate tension, and wherein an area of the annular body between the annular indentation and the central hole defines a web configured to be supported from below by a joint member having an enlarged or oversized opening, and wherein the annular indentation is offset from the annular protuberance and located farther from the central hole of the annular body than the annular protuberance.

17. The direct tension indicating washer of claim 16, wherein the annular protuberance is defined by (a) a pair of outer sidewalls extending away from the first face of the annular body; and (b) an outer surface extending between the pair of outer sidewalls.

18. The direct tension indicating washer of claim 16, wherein the annular indentation is defined by (a) a pair of inner sidewalls extending partially through the annular body from the second face of the annular body; and (b) an inner surface extending between the pair of inner sidewalls.

19. The direct tension indicating washer of claim 16, wherein the annular protuberance completely surrounds the central hole of the annular body.

20. The direct tension indicating washer of claim 16, wherein the annular protuberance is concentric with the central hole.

* * * * *